Oct. 4, 1966

F. K. WYCKOFF 3,276,465

BACKFLOW PREVENTION DEVICE AND RELIEF VALVE CONTROL

Filed Jan. 18, 1963

INVENTOR.
Fred K. Wyckoff
BY
Bacon & Thomas
ATTORNEYS

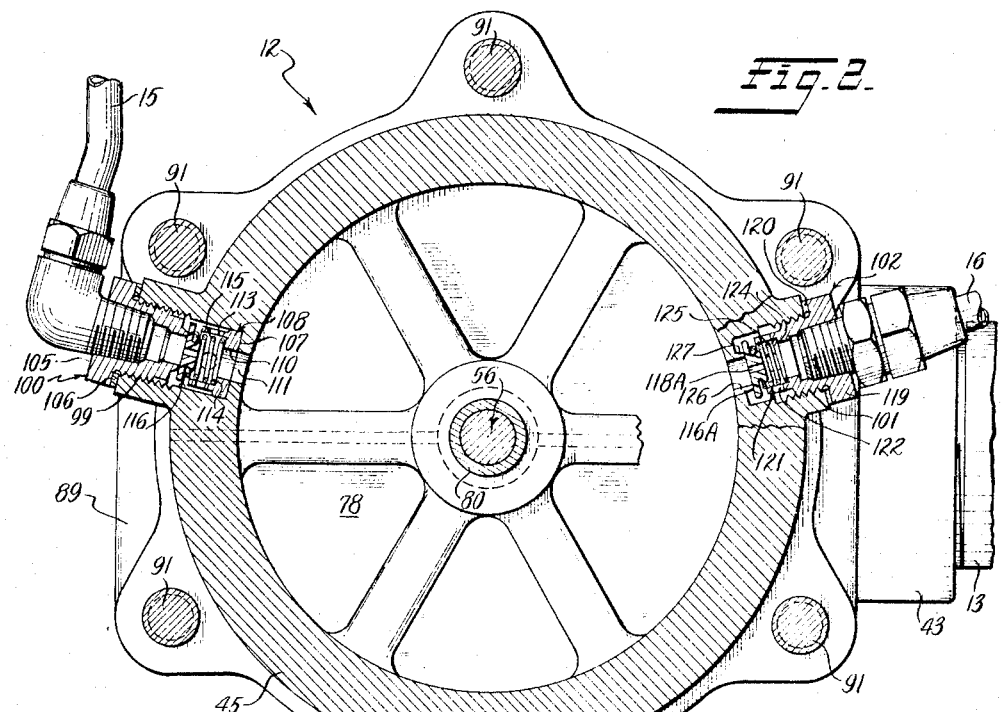
Fig. 2.
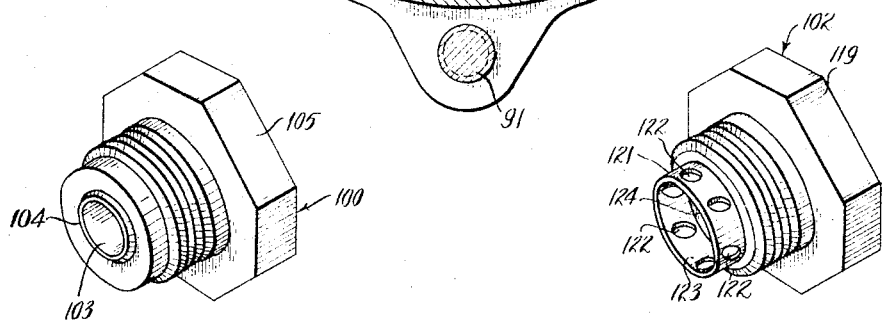
Fig. 3. Fig. 4.
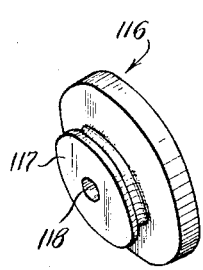
Fig. 5.
Fig. 6.
INVENTOR.
Fred K. Wyckoff
BY
Bacon & Thomas
ATTORNEYS

United States Patent Office 3,276,465
Patented Oct. 4, 1966

3,276,465
BACKFLOW PREVENTION DEVICE AND RELIEF VALVE CONTROL
Fred K. Wyckoff, Costa Mesa, Calif., assignor to Donald G. Griswold
Filed Jan. 18, 1963, Ser. No. 252,488
16 Claims. (Cl. 137—107)

The present invention relates to a backflow prevention device for preventing contamination of public water distribution systems supplying water to dwellings, hotels, factories, etc., through back-siphonage.

More particularly, the invention relates to a backflow prevention device of the type including a first check valve, a second check valve connected in series therewith, a relief valve connected with a zone between the inlets of the two check valves for draining said zone at times when a predetermined pressure differential exists across the first check valve and wherein the relief valve is responsive to the pressure differential across the first check valve derived from sensing points located at the inlet of the respective check valves and communicated to opposed pressure chambers in the relief valve. A backflow prevention device, such as described above, normally includes a first gate valve connected with the inlet of the first check valve, and a second gate valve connected with the outlet of the second check valve.

In certain backflow prevention installations, particularly where there is a substantial range in pressure variation in the supply line, or where the supply line is subjected to substantial surges, or where through carelessness, or otherwise, the inlet gate valve is only partially opened, instead of being fully open, and the backflow prevention unit is required to operate under abnormal conditions, differential pressure conditions are produced which adversely affect the operation of the relief valve, causing it to frequently open and drain the unit, or to "spit" excessively, or to remain open for abnormally long periods of time.

It is the principal object of the present invention to provide means that will control the relief valve so that the foregoing objections will be avoided. This object is accomplished by associating with the relief valve, sensing check valves designed so that the relief valve will respond rapidly to closing pressure differential values, and respond slowly to opening pressure differential values, and thus avoid frequent opening induced by conditions other than a true reverse flow or back-siphonage condition. The sensing check valves have been preferably so designed that they can be installed in a body portion of the relief valve, but it will be understood that they may be installed at the sensing points of the first and second check valves, or in the tubing connecting the sensing points with the pressure chambers in the relief valve.

In connection with the foregoing, the sensing check valves are arranged to permit rapid flow of operating fluid to the relief valve to effect quick closing of the relief valve in response to a closing pressure differential value, and to permit operating fluid to flow to the relief valve at a restricted rate to effect opening of the relief valve at a corresponding slow rate in response to an opening differential pressure value. The sensing check valves are themselves designed so that they will permit rapid flow of operating fluid in one direction and relatively constricted flow in the opposite direction.

Accordingly, a further object is to provide a pressure differential relief valve that will respond rapidly to closing differential pressure across the first check valve of the backflow unit and will respond relatively slowly to opening differential pressure across said check valve.

Another object is to provide a backflow unit having a relief valve including control means associated therewith for avoiding the effect thereon of varying pressure changes due to surges in the supply line, or to varying pressures in said supply line sensed through the tubes connecting the relief valve with the backflow unit.

Still another object is to provide, in a backflow unit, means which will completely isolate the pressure differential relief valve from surge effects or variations in pressure in the supply line.

Still another object is to provide control means for the relief valve of a backflow unit that will provide normal operation even under abnormal conditions, such as a partially opened inlet gate valve.

Other objects and advantages of the invention will be apparent from the following description taken in conjunction with the accompanying drawings, in which:

FIG. 2 is an enlarged horizontal sectional view through the relief valve, taken on the staggered line 2—2 of FIG. 1;

FIG. 3 is a perspective view of a special fitting mounted in an opening of the relief valve communicating with the pressure chamber thereof that is connected with the inlet of the first check valve;

FIG. 4 is a perspective view of the special fitting mounted in an opening of the relief valve communicating with the pressure chamber thereof that is connected with the inlet of the second check valve;

FIG. 5 is a perspective view of a sleeve associated with the special fitting shown in FIG. 3; and FIG. 6 is a perspective view of a check valve disc that is associated with the fitting shown in FIG. 3 and the sleeve shown in FIG. 5, and also with the fitting shown in FIG. 4, to form sensing check valve assemblies.

Figure 1:
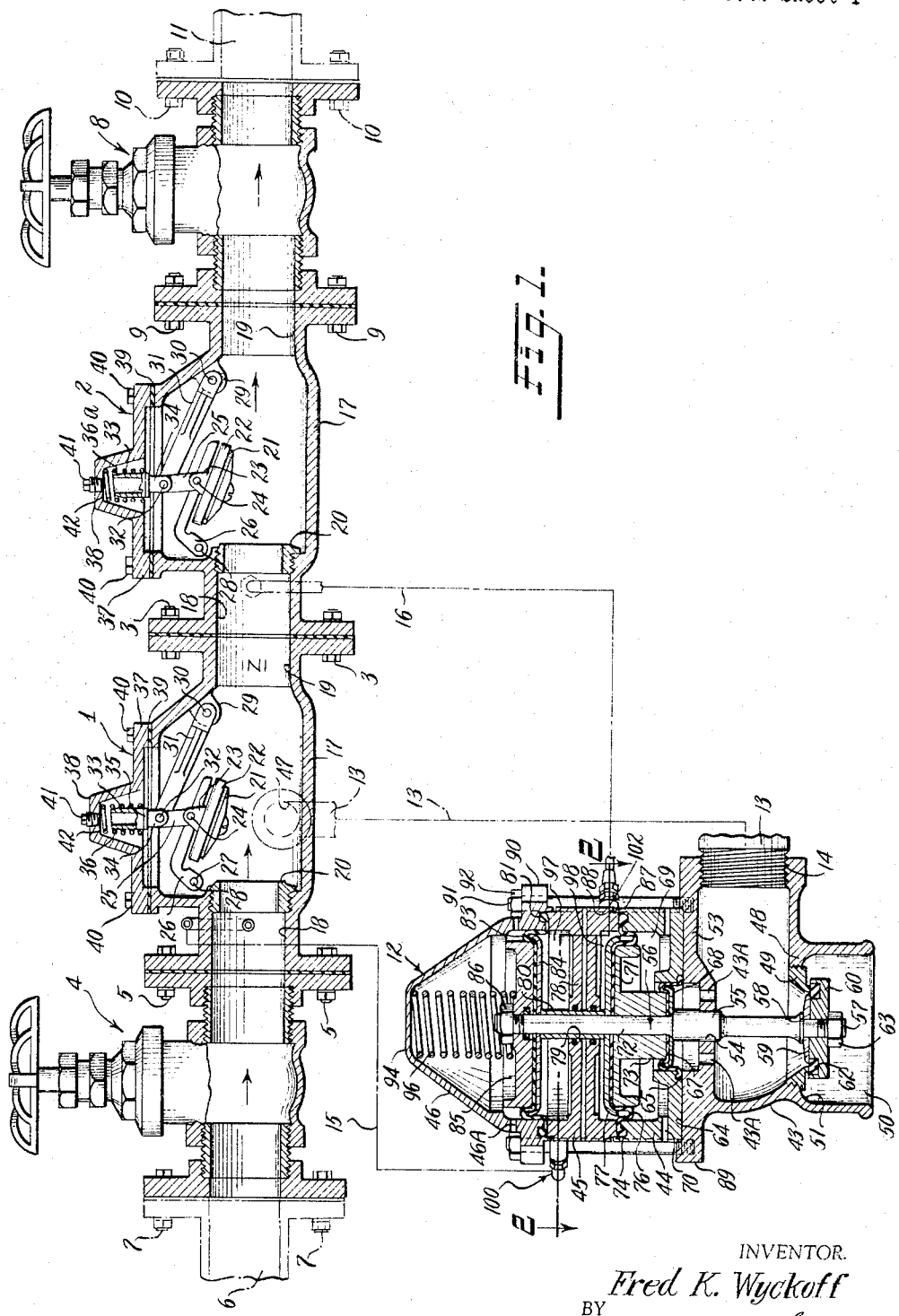
FIG. 1 is a diagrammatic sectional view through a backflow unit and improved pressure differential responsive relief valve connected therewith, constructed in accordance with the present invention.

Referring to FIG. 1, the backflow unit comprises a first check valve 1 and a second check valve 2, said valves having flanged ends connected by bolts 3. A flanged gate valve 4 is connected to the inlet side of the check valve 1 by bolts 5 and the inlet side of the gate valve 4 is connected to a flanged pipe or main 6 by bolts 7. The outlet side of the check valve 2 is connected to a similar gate valve 8 by bolts 9, and the outlet side of said gate valve is connected by bolts 10 to a flanged service pipe 11 leading to the consumer's premises. The gate valves 4 and 8 are conventional and serve as shutoff valves for isolating the backflow unit from either the supply main 6, or the service pipe 11, for inspection or repair.

An automatic pressure differential responsive relief valve 12 is connected by piping 13 with the check valve 1 so that its inlet 14 communicates with a zone Z including the outlet of the check valve 1 and the inlet of the check valve 2. The relief valve 12 includes pressure chambers (described later) that are connected, by conduits or tubes 15 and 16, respectively, with sensing points located at the inlet side of the check valve 1 and at the inlet side of the check valve 2.

The check valves 1 and 2 are preferably alike, and a description of one will suffice for both. Each check valve includes a body 17 having an inlet 18 and an outlet 19 axially aligned therewith. The inner end of the inlet 18 is threaded to receive a seat 20. The seat 20 is engaged by a flow control disc 21, which may be made of synthetic rubber or other yieldable material. The disc 21 is carried by a retainer 22.

The disc retainer 22 has a pair of spaced ears 23, which receive a pin 24 for pivotally connecting one end of a pair of links 25 thereto. The pin 23 extends through a hinge member 26 that has a laterally extending eye 27 for pivotally mounting the same upon a pin 28. The valve body 17 has openings, not shown, in the opposite side walls thereof for receiving the pin 28. The valve body 17 also has lugs 29, which have openings for a pin 30. One end of a lever 31 is pivotally mounted on the pin 30 and its opposite end is connected by a pin 32 with the links 25. A yoke 33 has a pair of depending ears 34 through which the pin 32 extends. The yoke 33 includes an elongated cylindrical portion that has diametrically, outwardly projecting stops 35 at its base. The lower end of a compression spring 36 seats on the yoke 33 in the region of the stops 35.

The valve body 17 is closed by a cover 37 having a central conical boss 38. A gasket 39 is disposed between the body 17 and the cover 37. Bolts 40 extend through the cover 37 and gasket 39 into threaded openings in the body 17 for mounting the cover 37 in place. A threaded vent opening in the boss 38 is closed by a plug 41. The interior of the boss 38 includes a shoulder 42 that serves as a seat for the upper end of the spring 36.

It will be understood that the proportions and arrangement of the lever 31, the links 25 and the pivot pins 24, 28, 30 and 32 are such that a toggle mechanism is formed wherein, when the valve is fully closed, the axis of the pin 24 lies above a line drawn through the axes of the pivot pins 24 and 30. It will also be understood that the spring 36 acts on the toggle linkage through the yoke 33, tending at all times to urge the valve disc 21 into valve-closing engagement with the seat 20. It will be further observed that valve body 17 is devoid of any interior obstructions between the valve seat 20 and the outlet opening 19, whereby fluid can flow through the valve with a minimum of pressure loss. It will be still further understood that when the valve is in its wide-open position, as shown in FIG. 1, the stops 35 on the yoke 33 engage the lower surface of the cover 37 and positively limit the extent of opening of the valve and also the extent of compression of the spring 36.

The spring 36 is preferably made of stainless steel and is designed so that, for a 2" valve, a pressure differential of about 5.6 p.s.i. is required to start opening movement of the first check valve 1, with a required increase in this differential up to slightly under 8 p.s.i. to initially open the valve disc 21 approximately one to two degrees. The 8 p.s.i. differential pressure corresponds to a flow rate of about 6 g.p.m. However, once the check valve has been opened, the differential pressure required to maintain the same open, decreases as the rate of flow increases. Thus, at a flow rate of about 6 g.p.m., the pressure loss through the first check valve 1, due to the force required to maintain the valve open, is about 4.6 p.s.i. or about 1 p.s.i. less than the unseating force.

The second check valve 2 is preferably identical to the check valve 1, but is provided with a weaker spring 36a, so that the pressure differential required to unseat the disc 21 of the check valve 2 is about 1.8 p.s.i., rising to about 2.6 p.s.i. to effect full opening of the valve, with a flow of about 4 g.p.m. As the flow rate increases, there is a decrease in the pressure drop so that for the same flow rate of 90 g.p.m., the pressure drop is about 2.2 p.s.i. and gradually increases as the flow rate increases.

Referring now to the relief valve 12, FIG. 1, the same has a body made of four sections 43, 44, 45 and 46. The lowermost section 43 has the threaded inlet opening 14 for receiving one end of the piping 13, the other end of which is connected with an opening 47 in a side wall of the check valve body 17. The section 43 also has a partition 48 with a threaded opening in which a seat 49 is mounted. A discharge opening 50 communicates with the atmosphere and is disposed below the seat 49. The upper portion of the opening 50 is somewhat dome-shaped, as indicated at 51, in order to provide minimum resistance to the discharge of water through the seat 49. The body section 43 further includes an upper wall 53 having an opening 54, which slidably receives an enlarged portion 55 of a valve stem 56. The lower end 57 of the valve stem is reduced and threaded and extends from a shoulder 58 that forms an abutment for a clamping disc 59. A disc retainer 60 carries a valve disc 62. The retainer 60 is mounted on the stem portion 57 and is held in place by a nut 63. The disc 62 cooperates with the seat 49 for controlling flow through the relief valve 12. The upper wall 53 of the body section 43 is recessed, as indicated at 64, for the reception of the lower surface of the body section 44. The body section 44 has a groove 65, which receives the outer thickened edge of a rolling diaphragm 67. A clamping disc 68 is mounted upon the valve stem 56 and engages the upper face of the stem enlargement 55, to form a support for the lower side of the diaphragm 67. The body section 44 contains a chamber 69 that continuously communicates with the atmosphere through vent openings 70 at the lower part of said chamber. A piston 71 is mounted upon a reduced upper portion 72 of the valve stem 56, and has a cylindrical central projection 73 that engages the upper surface of the diaphragm 67. The body section 44 also has a groove 74 formed in its upper surface to receive the thickened margin of a relatively larger rolling diaphragm 76. The lower surface of the diaphragm 76 engages the upper surface of the piston 71, and a clamping disc 77 engages the upper surface of said diaphragm to clamp it against said piston.

The body section 45 has an intermediate transverse wall 78 provided with a central opening 79, which slidably receives a spacer sleeve 80, the lower end of which is engaged with the clamping disc 77.

The body section 46 serves as a cover, and has a groove 81 at its lower edge, which receives the thickened margin of a rolling diaphragm 83 that is identical to the diaphragm 76. A clamping washer 84 is engaged with the upper end of the spacer 80 and forms a support for the lower side of the diaphragm 83. A piston 85 is mounted upon the stem portion 72 and engages the upper side of the diaphragm 83. The upper extremity of the stem 56 is threaded, and a nut 86 mounted thereon secures the clamping disc 68, diaphragm 67, piston 71, diaphragm 76, clamping disc 77, sleeve 80, clamping disc 84, diaphragm 83 and piston 85, in assembled relation with the stem 56. It will be noted that the clamping discs 68, 77 and 84 all have margins that are cupped to provide good support for the rolling diaphragms 67, 76 and 83, respectively, associated therewith.

The body sections 44 and 45 are maintained in proper registration by a marginal ridge 87 on the section 44 and a complementary marginal recess 88 formed on the section 45. The section 45 and cover 46 are maintained in registration by a similar ridge and recess arrangement.

The body section 43 has a generally square flange 89 at its upper end and the cover section 46 has a similar flange 90 formed at its lower end. A stud 91 is mounted at each corner of the flange 89. A nut 92 is threaded onto each stud 91 for securely clamping the body sections 43, 44, 45, and 46 together. The cover section 46 is hollow and has a wall 94 engaged by the upper end of a calibrated compression spring 96, the lower end of which is engaged with the piston 85.

The intermediate wall 78 in the body section 45 cooperates with the diaphragms 83 and 76 to provide an upper pressure chamber 97 and a lower pressure chamber 98, respectively. A threaded opening 99, FIG. 2, communicates with the chamber 97 and has a special fitting 100 mounted therein which is connected to one end of the tube 15 leading from the inlet chamber of the check valve 1. A similar threaded opening 101 communicates with the chamber 98 and has a special fitting 102 mounted therein, which is connected to one end of the tube 16 leading from the inlet of the check valve 2.

The fitting 100 is best illustrated in FIG. 3 and includes an externally threaded hollow body having a passage 103 extending therethrough, and an inner end provided with a valve seat 104 surrounding said passage. The outer end of the body has a head 105 that is hexagonal-shaped for engagement by a wrench to aid in mounting the fitting in the opening 99. A gasket 106 is disposed beneath the head 105 to form a seal.

The inner end of the opening 99 is counterbored to provide a shoulder 107, which is engaged by a sleeve 108, best shown in FIG. 5. The sleeve 108 has a cylindrical portion 109 at one end of a size to fit the counterbore, and is provided with an opening 110 that communicates with a passage 111 at the inner end of the opening 99. The sleeve 108 also includes an axially projecting annular skirt 112 having six, 5/32" diameter radial ports 113 extending therethrough. A shoulder 114 within the sleeve 108 forms a support for one end of a compression spring 115. The other end of the spring 115 is connected with a check valve disc 16, FIG. 6, having a grooved, cylindrical projection 117 to which the end convolution of the spring is attached. The valve disc 116 is normally urged toward the seat 104 on the fitting 100 by the spring 115, although said disc can be moved into engagement with the adjacent end of the sleeve 108 in response to the flow of operating fluid through the tube 15 into the upper pressure chamber 97.

The valve disc 116 has a central orifice 118 about 1/16" in diameter through which operating fluid can flow at a restricted rate even when said valve disc is seated against the end of the sleeve 108. It will also be apparent that when the disc 116 is thus seated, operating fluid can also flow through the relatively larger ports 113 in the sleeve 108 at a rapid rate. Thus, it will be obvious that operating fluid can flow at a rapid rate through the fitting 100 and past the valve disc 116 into the chamber 97, but that flow in the opposite direction will be reduced to the restricted rate permitted by the orifice 118 in said disc.

The opening 101 in the section 45 of the relief valve body communicating with the lower pressure chamber 98 is also threaded at its outer end and has the special fitting 102 mounted therein, to which the tube 16 is connected. The fitting 102 is externally threaded and has a hexagonal-shaped head 119 at one end for tightening the same in the opening 101. A gasket 120 is positioned beneath said head to form a seal. The fitting 102 has an axially extending cylindrical skirt portion 121 at its inner end having six radial ports 122 extending therethrough of the same diameter as the ports 113 in the sleeve 108. A counterbore 123 is formed within the skirt 121 and provides a shoulder 124 serving as a support for one end of a compression spring 125.

The inner end of the opening 101 has a passage 126 surrounded by a seat 127 facing toward the outer end of said opening. A check valve disc 116A, similar to the disc 116, and having a restricted orifice 118A therein, is disposed between the seat 127 and the inner end of the skirt 121. The check valve disc 116A is secured to the spring 125 in the same manner previously described in connection with the check valve disc 116.

It will be understood that the sensing check valve assembly comprising the fitting 100, sleeve 108, spring 115, and valve disc 116 functions in a manner opposite to the sensing check valve assembly comprising the fitting 102, valve disc 116A, and spring 125, in that the first-mentioned valve disc 116 will always permit rapid flow of operating fluid into the upper chamber 97 and restrict the rate of flow of operating fluid from said chamber; whereas the valve disc 116A will restrict the rate of flow into the lower chamber 98 and permit flow from said lower chamber at a rapid rate.

Pressure fluid communicated to the chamber 97 through the tubing 15 and sensing check valve assembly (100, 116, 115 and 108) associated therewith will act upon the valve stem 56 through the diaphragm 83, in opposition to the force of the spring 96, and tend to move the valve stem 56 quickly in a direction to rapidly close the relief valve 12, or to maintain it closed.

On the other hand, pressure fluid communicated to the lower chamber 98 through the tube 16 and sensing check valve assembly (102, 125, and 116A) associated therewith will act on the valve stem 56 through the diaphragm 76 and tend to move said valve stem in a direction to slowly open the relief valve 12. While the pressure in the chamber 98 is supplemented by the force of spring 96 tending to open the relief valve 12, such opening action is retarded by the restricted, slow rate at which operating fluid can be expelled from the upper chamber 97, due to the controlling action of the orifice 118 in the valve disc 116; as well as the control effected by the orifice 118A in the valve disc 116A.

The force exerted by the spring 96 is preferably such that a pressure differential of only 2½ pounds or less in the chambers 97 and 98 will cause the relief valve 12 to open and thereby effect drainage of any liquid in the zone Z. In this connection, the cover section 46 is vented to the atmosphere through openings 46A, so that atmospheric pressure acts upon the upper side of the piston 85 and on the diphragm 83 against hydraulic pressure in the chamber 97. Similarly, atmospheric pressure acts upon the lower surface of the piston 71 and diaphragm 76 through the vent openings 70, against the hydraulic pressure in the chamber 98. The wall 53 of the body section 43 has vent openings 43A, which communicate the inlet pressure of the relief valve 12 to the lower side of the clamping disc 68 and the diphragm 67. Atmospheric pressure is effective upon the upper side of the diaphragm 67 through the vent openings 70.

The force exerted by the spring 96 is preferably equivalent to 2½ p.s.i., plus or minus ½ p.s.i. difference in pressure between the chambers 98 and 97. The effective areas of the diaphragms 76 and 83 are equal. The effective area of the diaphragm 67 is equal to the effective area of the seat 49. Thus, the hydraulic forces can be virtually balanced and the spring load becomes the major factor tending to open the relief valve 12, although as pointed out above, the orifice 118 opposes expulsion of operating fluid from the chamber 97, except at a very slow rate.

The design of the relief valve 12 is such that when operating as a component of a backflow unit, it will normally remain in a closed position so long as the difference in the pressure at the inlet of the check valve 1 and in the zone Z between the two check valves 1 and 2 exceeds 2 p.s.i. If the pressure differential drops to 2 p.s.i., the relief valve 12 will open and continue to open wider, should the pressure in the zone Z decrease relative to the pressure at the inlet side of the check valve 1. In the normal operation of the present backflow unit, check valve 1 and 2 will be opened and relief valve will be closed as shown in FIG. 1. The check valve 1 by itself would reduce the supply pressure by a predetermined amount, for example, about 4½ p.s.i. at 100 g.p.m. The check valve 2 also reduces the pressure, but in a lesser amount. At a flow rate of 100 g.p.m., check valve 2 by itself would reduce the pressure about 2.2 p.s.i. However, the check valves in combination in the unit produce an overall pressure drop of only about 6.5 p.s.i. at a 100 g.p.m. flow rate. During normal flow, and at cessation of flow, the pressure in the zone Z between the check valves 1 and 2 will be less than the supply main pressure. Moreover, it will be understood that the check valves 1 and 2 open only sufficiently to supply the existing demand.

The effect of the control of the two sensing check valve assemblies on the relief valve 12 is to snub or nullify the effect of certain pressure changes sensed through the tubes 15 and 16. These sensing check valves also prevent cycles of varying pressure, such as line surges, from being transmitted to the relief valve in a manner that would cause unnecessary opening and excessive "spitting." Line surges can, depending upon the frequency of the cycles, continue for some time and, in addition to causing wasteful bleeding through the backflow unit, cause annoying noise or even damage. The sensing check valves of the present invention tend to completely isolate the surge effect in the supply line from the relief valve 12.

The sensing check valves also eliminate similar problems resulting from the normal rise and fall of the supply line pressure, or from sudden building up of pressure at the inlet side of the backflow unit. Thus, any tendency for excessive draining through the relief valve 12 in response to a low pressure differential across the first check valve is substantially reduced.

The arrangement of the two sensing check valve assemblies, as described above, will cause the relief valve 12 to close at a rapid rate in response to a pressure differential value calling for closing of the relief valve, and will restrict the flow of operating fluid to effect opening of the relief valve only at a relatively slow rate in response to pressure differential values calling for opening of the relief valve, whereby the backflow unit is stablized against opening in response to the effects of abnormal conditions, other than a true back-siphoning condition. In this connection, the control means for the relief valve is particularly effective to cause rapid closing of the relief valve in a situation where the inlet gate valve is only partially opened, instead of being fully opened, so that the flow rate and pressure differential would otherwise build up too slowly to maintain the relief valve 12 closed and thus cause wasteful and prolonged draining of the backflow unit.

It will be understood that the design, arrangement, and location of the sensing check valve elements associated with the relief valve 12 may be varied from that disclosed herein without departing from the principles of the invention or the scope of the annexed claims.

I claim:

1. A backflow prevention unit adapted to be connected between a supply main and a service pipe, comprising: a first check valve and a second check valve, said check valves being connected in series, said first check valve having an inlet adapted to be subjected to the pressure in said supply main, and said second check valve having an outlet adapted to be subjected to the pressure in said service pipe; a differential pressure responsive relief valve communicating with said check valves at a zone including the outlet of the first check valve and the inlet of the second check valve for effecting draining of said zone; and means controlling said relief valve in accordance with the differential pressure across said first check valve arranged to cause said relief valve to respond rapidly to a closing differential pressure value and close correspondingly rapidly, and to respond relatively slowly to an opening differential pressure value and open correspondingly slowly.

2. A backflow prevention unit as defined in claim 1, wherein the means controlling the relief valve includes diaphragm means subject to the differential pressure across the first check valve, and wherein sensing check valve means control the rate of flow of operating fluid at one rate to urge said diaphragm means in one direction at one rate, and control the flow of operating fluid at a different rate to urge said diaphragm means in the opposite direction at a different rate.

3. A backflow prevention unit as defined in claim 2, in which the sensing check valve means controls the rate of flow of operating fluid to the diaphragm means to effect the rapid closing and relatively slow opening of the differential pressure responsive relief valve in accordance with changes in the differential pressure values across the first check valve.

4. A backflow prevention unit adapted to be connected between a supply main and a service pipe, comprising: a first check valve and a second check valve, said check valves being connected in series, said first check valve having an inlet adapted to be subjected to the pressure in said supply main, and said second check valve having an outlet adapted to be subjected to the pressure in said service pipe, a differential pressure relief valve communicating with said check valves at a zone including the outlet of the first check valve and the inlet of the second check valve for effecting draining of said zone; and means controlling said relief valve so that it will respond rapidly to closing pressures and respond slowly to opening pressures, said means including a pair of diaphragms forming walls of pressure chambers that are subject respectively to the pressure at the inlet and at the outlet of the first check valve; and sensing check valve elements controlling the flow of operating fluid into each of said pressure chambers, one of said check valve elements being arranged to permit flow of operating fluid into one of said pressure chambers at a rapid rate and from said one chamber at a relatively restricted rate, and the other of said check valve elements being arranged to permit flow of operating fluid into the other of said pressure chambers at a restricted rate and from said other chamber at a relatively rapid rate.

5. A backflow prevention unit adapted to be connected between a supply main and a service pipe, comprising: a first check valve and a second check valve, said check valves being connected in series, said first check valve having an inlet adapted to be subjected to the pressure in said supply main, and said second check valve having an outlet adapted to be subjected to the pressure in said service pipe; a differential pressure relief valve communicating with said check valves at a zone including the outlet of the first check valve and the inlet of the second check valve for effecting draining of said zone, said relief valve having an element controlling flow therethrough; and fluid pressure operable means controlling said flow control element including a pair of diaphragms connected with said element, said diaphragms being responsive to the differential pressure at sensing points across said first check valve; and means controlling the supply and exhaust of operating fluid to said diaphragms from said sensing points to effect rapid closing movement, and slow opening movement, of said flow control element.

6. A backflow prevention unit as defined in claim 5, in which the means controlling the supply and exhaust of operating fluid to the diaphragms includes check valves disposed between the sensing points and the diaphragms.

7. A backflow prevention unit is defined in claim 6, in which the check valves provide rapid flow therethrough in one direction and relatively restricted flow in the opposite direction.

8. A pressure differential operable valve, comprising: a body having an inlet and an outlet and a seat between said inlet and outlet; a valve disc engageable with said seat for controlling flow therethrough; a valve stem connected with said valve disc; means including diaphragms providing a pair of pressure chambers; means connecting said diaphragms with said valve stem, said valve body including an opening communicating with each pressure chamber for admitting operating fluid into the respective pressure chambers, said diaphragms being arranged so that operating fluid effective on one diaphragm will move the valve stem toward valve closing position, and operating fluid effective on the other diaphragm will move the valve stem toward valve opening position; and means controlling the flow of operating fluid to and from said respective chambers to effect rapid closing movement, and relatively slow opening movement, of said valve stem.

9. A pressure differential operable valve as defined in claim 8, in which each opening communicating with a pressure chamber contains a sensing check valve element having a flow-restricting orifice, and wherein the sensing check valve elements are arranged in the respective openings so that when operating fluid is flowing through one of said openings into one of said pressure chambers at a rapid rate, operating fluid will be discharged at a corresponding rate from the other pressure chamber through the other opening to effect the rapid closing movement of the valve stem, and when operating fluid is flowing through said other opening into said other pressure chamber at a restricted rate, operating fluid will be discharged at a corresponding rate from said one pressure chamber through said one opening to effect the slow closing movement of the valve stem.

10. A pressure differential operable valve as defined in claim 8, wherein one of the openings for admitting operating fluid into one pressure chamber has a sensing check valve assembly associated therewith including: a fitting mounted in the outer end of said opening having a through-passage, and a seat at its inner end surrounding said passage, a sleeve disposed in said opening inwardly of said fitting, a valve disc alternately seatable in open position upon one end of said sleeve, or against the seat on the inner end of said fitting in closed position, and a spring normally urging said valve disc in a direction toward closed position against said fitting, said sleeve including means for by-passing operating fluid around said valve disc when said valve disc is seated against said one end of said sleeve.

11. A pressure differential operable valve as defined in claim 10, wherein the valve disc has a flow-restricting orifice to permit limited flow therethrough when said valve disc is seated against the seat on the inner end of said fitting.

12. A pressure differential operable valve as defined in claim 8, wherein one of the openings for admitting operating fluid into one pressure chamber has a sensing check valve assembly associated therewith including: a fitting mounted in the outer end of said opening having a cylindrical skirt extending inwardly therefrom, the inner end of said opening having a shoulder providing a seat, a valve disc alternately seatable upon one end of said skirt in open position, or against said seat in closed position, and a spring normally urging said check valve element in a direction toward closed position against said seat, said skirt including means for bypassing operating fluid around said valve disc when said valve disc is seated against the end of said skirt.

13. A pressure differential operable valve as defined in claim 12, wherein the valve disc has a flow-restricting orifice to permit limited flow therethrough when said valve disc is seated against the seat at the inner end of said opening.

14. A pressure differential operable valve, comprising: a body having four sections, the first section having an inlet and an outlet and a valve seat between said inlet and outlet; a valve disc engageable with said seat; a valve stem connected with said valve disc; a second section disposed adjacent said first section and having a central opening formed therein to receive said valve stem; a first diaphragm extending across said central opening and being connected with said valve stem; a third section disposed adjacent said second section and including a transverse wall providing a chamber for fluid pressure on the opposite sides thereof, said stem extending through said transverse wall; a fourth section adjacent said third section; a second diaphragm arranged between said second and third sections; a third diaphragm arranged between said third and fourth sections; means connecting said valve stem with said second and third diaphragms, said second and third diaphragms cooperating with the wall of said third section to provide a pair of pressure chambers, said third section having means for admitting operating fluid under pressure into said pair of pressure chambers at different rates and for exhausting operating fluid from said pressure chambers at different rates, whereby any differential pressure present will be effective to move said valve stem in one direction or the other to respectively open and close the valve at different rates; and a compression spring in said fourth section acting upon said valve stem to move the same toward valve opening position.

15. A pressure differential operable valve as defined in claim 14, wherein the means for admitting operating fluid into one of the pair of pressure chambers comprises a first opening in the third section of the valve body containing a first sensing check valve assembly, including: a fitting mounted in the outer end of said first opening having a through-passage, and a seat at its inner end surrounding said passage, a sleeve disposed in said first opening inwardly of said fitting, a valve disc alternately seatable in open position upon one end of said sleeve, or against the seat on the inner end of said fitting in closed position, and a spring normally urging said valve disc in a direction toward closed position against said fitting, said sleeve including means for by-passing operating fluid around said valve disc when said valve disc is seated against said one end of said sleeve; and wherein the means for admitting operating fluid into the other of the pair of pressure chambers comprises a second opening in the third section of the valve body containing a second sensing check valve assembly associated therewith including: a fitting mounted in the outer end of said second opening having a cylindrical skirt extending inwardly therefrom, the inner end of said second opening having a shoulder providing a seat, a valve disc alternately seatable upon one end of said skirt in open position, or against said seat in closed position, and a spring normally urging said check valve element in a direction toward closed position against said seat, said skirt including means for by-passing fluid around said valve disc when said valve disc is seated against the end of said skirt.

16. A pressure differential operable valve as defined in claim 15, wherein each of the valve discs has a flow-restricting orifice to permit limited flow therethrough when said valve discs are in closed position.

References Cited by the Examiner
UNITED STATES PATENTS

| | | | |
|---|---|---|---|
| 2,146,204 | 2/1939 | Dore | 137—116 |
| 2,155,558 | 4/1939 | Laughlin | 137—116 |
| 2,389,412 | 11/1945 | Carlton | 137—116 |
| 2,503,424 | 4/1950 | Snyder | 137—116 |
| 2,586,942 | 2/1952 | Grove | 137—115 |
| 3,084,709 | 4/1963 | Flick | 137—513.3 X |

WILLIAM F. O'DEA, *Primary Examiner.*

CLARENCE R. GORDON, *Examiner.*